(12) United States Patent
Nakao

(10) Patent No.: US 7,430,436 B2
(45) Date of Patent: Sep. 30, 2008

(54) WIRELESS COMMUNICATION DEVICE AND TRANSMISSION POWER CONTROL METHOD OF ITS CONNECTION REQUEST

(75) Inventor: Fumiaki Nakao, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 627 days.

(21) Appl. No.: 11/080,221

(22) Filed: Mar. 15, 2005

(65) Prior Publication Data
US 2005/0227721 A1 Oct. 13, 2005

(30) Foreign Application Priority Data

Mar. 17, 2004 (JP) .............................. 2004-077261
Mar. 25, 2004 (JP) .............................. 2004-090429

(51) Int. Cl.
*H04B 7/00* (2006.01)
*H04Q 7/20* (2006.01)
(52) U.S. Cl. ...................... 455/522; 455/69; 455/67.11; 455/510
(58) Field of Classification Search ................. 455/510, 455/522, 69, 67.13, 67.11, 423, 501, 550.1, 455/561, 435.1, 435.3, 435.2, 517, 509; 370/230, 370/252
See application file for complete search history.

(56) References Cited

U.S. PATENT DOCUMENTS 5,956,649 A 9/1999 Mitra et al.
7,164,654 B2 * 1/2007 Hunzinger et al. .......... 370/230
2004/0203456 A1 * 10/2004 Onggosanusi et al. .... 455/67.13
2005/0130689 A1 * 6/2005 Miyamoto ................... 455/522
2005/0283663 A1 * 12/2005 Frederiksen et al. .......... 714/14

FOREIGN PATENT DOCUMENTS

JP 08-307344 11/1996

OTHER PUBLICATIONS

Japanese Publication No. 08-307344 corresponds to the U.S. Patent No. 5,956,649.

* cited by examiner

*Primary Examiner*—John J. Lee
(74) *Attorney, Agent, or Firm*—Hogan & Hartson LLP

(57) ABSTRACT

A mobile station device includes a device for transmitting an access packet to a base station device, and a device for retransmitting the access packet when no acknowledgement is received from the base station in response to the transmission of the access packet. The mobile station device also includes a received power processing section for sequentially storing received power of a pilot signal transmitted from the base station, and determining transmission power at the retransmitting time of the access packet on the basis of these stored contents. A signal receiving section obtains interference amount information showing an interference amount in the base station. A data transmitting section transmits the access packet using power according to the interference amount information.

12 Claims, 4 Drawing Sheets

| SIGNAL RECEIVING TIME | RECEIVED POWER LEVEL OF PILOT SIGNAL | INTERFERENCE AMOUNT INFORMATION |
|---|---|---|
| 1 | L4 | 1 |
| 2 | L5 | 1 |
| 3 | L4 | 0 |
| 4 | L3 | 1 |
| 5 | L2 | 0 |
| 6 | L3 | 1 |
| 7 | L1 | 1 |
| 8 | L2 | 0 |
| 9 | L3 | 1 |
| 10 | L3 | 1 |

WIRELESS COMMUNICATION DEVICE AND TRANSMISSION POWER CONTROL METHOD OF ITS CONNECTION REQUEST

BACKGROUND OF THE INVENTION

The present invention relates to a wireless communication device and a connection request transmission power control method, and particularly relates to transmission power control in the wireless communication device when initiating a communication.

In a CDMA (code division multiple access) system wireless communication system, an access packet (connection request) is transmitted from a mobile station to a base station, and acknowledgement (ACK) is returned from the base station to the mobile station in response to this transmission so that the wireless communication between both the stations is initiated. Here, the transmission power of the access packet is first determined by open loop control on the mobile station side. Namely, a pilot signal is received from the base station in the mobile station, and the transmission power is determined on the basis of this received power. If the access packet is transmitted using the power thus determined and no acknowledgement in response to this access packet is received in the mobile station, the transmission power is increased by a power amount designated from the base station side, and the access packet is retransmitted. Thus, the base station can reliably receive the access packet transmitted from the mobile station. For example, a similar wireless communication system is disclosed in JP-A (Japanese Laid-Open Patent)-08-307344.

In the above system of the background art, the power is increased by a constant power amount designated from the base station side when retransmitting the access packet. Accordingly, there is a possibility that the power is uselessly consumed and connection time is increased. Namely, when the increase in transmission power is small, the retransmitting of the access packet is again performed. In this case, the connection time is lengthened and the consumed power is increased. Further, when the increase in transmission power is large, the acknowledgement is easily obtained, but power is needlessly consumed.

Further, in the above system of the background art, the transmission power when the access packet is transmitted the first time is merely determined by the open loop control and interference amount information in the base station is not taken into consideration. Therefore, in accordance with situations of the interference amount in the base station, there is a case in which no response (acknowledgement) is obtained from the base station in response to the transmission of the access packet. In this case, a problem exists in that the retransmitting of the access packet is obliged.

SUMMARY OF THE INVENTION

The invention is made in consideration of the above problems, and its object is to provide a wireless communication device able to suitably determine the transmission power when initiating the communication, and its transmission power control method.

To solve the above problems, the wireless communication device in accordance with a certain aspect of the invention is a wireless communication device including:

first transmitting means for transmitting a connection request to a base station; and retransmitting means for retransmitting the connection request when no acknowledgement is received from the base station in response to the transmission of the connection request;

the wireless communication device further including:

received power memory means for sequentially storing received power of a predetermined signal transmitted from the base station; and retransmitting power determining means for determining the transmission power of the connection request using the retransmitting means on the basis of the stored contents of the received power memory means.

Further, the transmission power control method of the connection request in accordance with another aspect of the invention is characterized in that the transmission power control method includes:

a first transmitting step for transmitting the connection request to a base station;

a retransmitting step for retransmitting the connection request when no acknowledgement is received from the base station in response to the transmission of the connection request;

a step for sequentially storing received power of a predetermined signal transmitted from the base station to received power memory means; and a retransmitting power determining step for determining the transmission power of the connection request in the retransmitting step on the basis of the stored contents of the received power memory means.

In accordance with the invention, the received power of the predetermined signal (e.g., a pilot signal or a control signal) transmitted from the base station is stored, and the retransmitting power is determined on the basis of its stored contents. Accordingly, the transmission power can be adaptively determined. Wasteful power consumption and an increase in connection time can be restrained.

In one mode of the invention, the retransmitting power determining means may determine a power increase amount on the basis of the stored contents of the received power memory means, and may also determine the transmission power of the connection request using the retransmitting means by adding the power increase amount to the transmission power of the first transmitting means. Thus, the connection request can be retransmitted using a power based on the transmission power of the first transmitting means.

In this mode, the retransmitting power determining means may calculate a changing rate of the received power stored to the received power memory means, and may determine the power increase amount on the basis of this changing rate. Thus, the retransmitting power of the connection request can be determined in accordance with the change of a communication situation.

Further, in one mode of the invention, the base station and the wireless communication device may perform wireless communication using a code division multiple access system, and may further include means for receiving interference amount information in the base station from the base station, and the retransmitting power determining means may further determine the transmission power of the connection request using the retransmitting means on the basis of the interference amount information. Thus, the retransmitting power of the connection request can be determined in consideration of the existence or largeness or smallness of the interference amount.

Further, in one mode of the invention, the transmission of the connection request using the first transmitting means may be again executed if no acknowledgement is received from the base station when the connection request are transmitted by a predetermined number of times. Thus, it is possible to reliably prevent the retransmitting power of the connection request from being increased excessively.

In this mode, the transmission of the connection request using the first transmitting means may be again executed after the passage of a predetermined standby time if no acknowledgement is received from the base station when the connection request is transmitted a predetermined number of times. Otherwise, the transmission of the connection request using the first transmitting means may be again executed after the passage of a standby time determined on the basis of a random number if no acknowledgement is received from the base station when the connection request are transmitted by the predetermined number of times.

Further, in one mode of the invention, the transmission of the connection request using the first transmitting means may be again executed using transmission power determined on the basis of the stored contents of the received power memory means if no acknowledgement is received from the base station when the connection request is transmitted a predetermined number of times. Thus, it is possible to raise the possibility that the base station can receive the connection request transmitted by the first transmitting means.

Further, a wireless communication device in accordance with another aspect of the invention is characterized in that the wireless communication device includes:

interference amount information obtaining means for obtaining interference amount information showing an interference amount in a base station; and data transmitting means for transmitting a connection request to the base station using power according to the interference amount information.

Further, a connection request transmission power control method in the wireless communication device in accordance with still another aspect of the invention is characterized in that the transmission power control method includes:

an interference amount information obtaining step for obtaining interference amount information showing an interference amount in a base station; and a data transmitting step for transmitting the connection request to the base station using power according to the interference amount information.

In accordance with the invention, for example, the transmission power of the connection request such as the access packet, etc. used in the wireless communication system of the CDMA system can be more suitably determined in consideration of the interference amount in the base station.

Further, in one mode of the invention, the data transmitting means includes:

basic power determining means for determining basic power in transmitting the connection request to the base station;

power correcting means for correcting the basic power in accordance with the interference amount; and the connection request are transmitted using the power provided by correcting the basic power in accordance with the interference amount. Thus, the connection request can be transmitted using power corrected in accordance with the interference amount.

In this mode, the basic power determining means may include received power obtaining means for obtaining the received power of a predetermined signal transmitted from the base station, and the basic power may be determined on the basis of the received power of the predetermined signal. Thus, the connection request can be transmitted using power according to the received power of the predetermined signal (e.g., the pilot signal) transmitted from the base station.

Further, in one mode of the invention, the wireless communication device further includes data retransmitting means for retransmitting the connection request to the base station by transmission power provided by adding a predetermined value to the transmission power determined by the transmission power determining means when no acknowledgement is received from the base station in response to the transmission of the connection request using the data transmitting means. Thus, the transmission power at the retransmitting time of the connection request can be determined in consideration of the interference amount in the base station.

DESCRIPTION OF THE PREFERRED EMBODIMENT

An embodiment of the present invention will next be explained in detail on the basis of the drawings. The disclosure of Japanese Patent Application Nos. 2004-77261 filed on Mar. 17, 2004 and 2004-90429 filed on Mar. 25, 2004, including specification, claims, drawings and abstract is incorporated herein by reference in its entirety.

Figure 1:
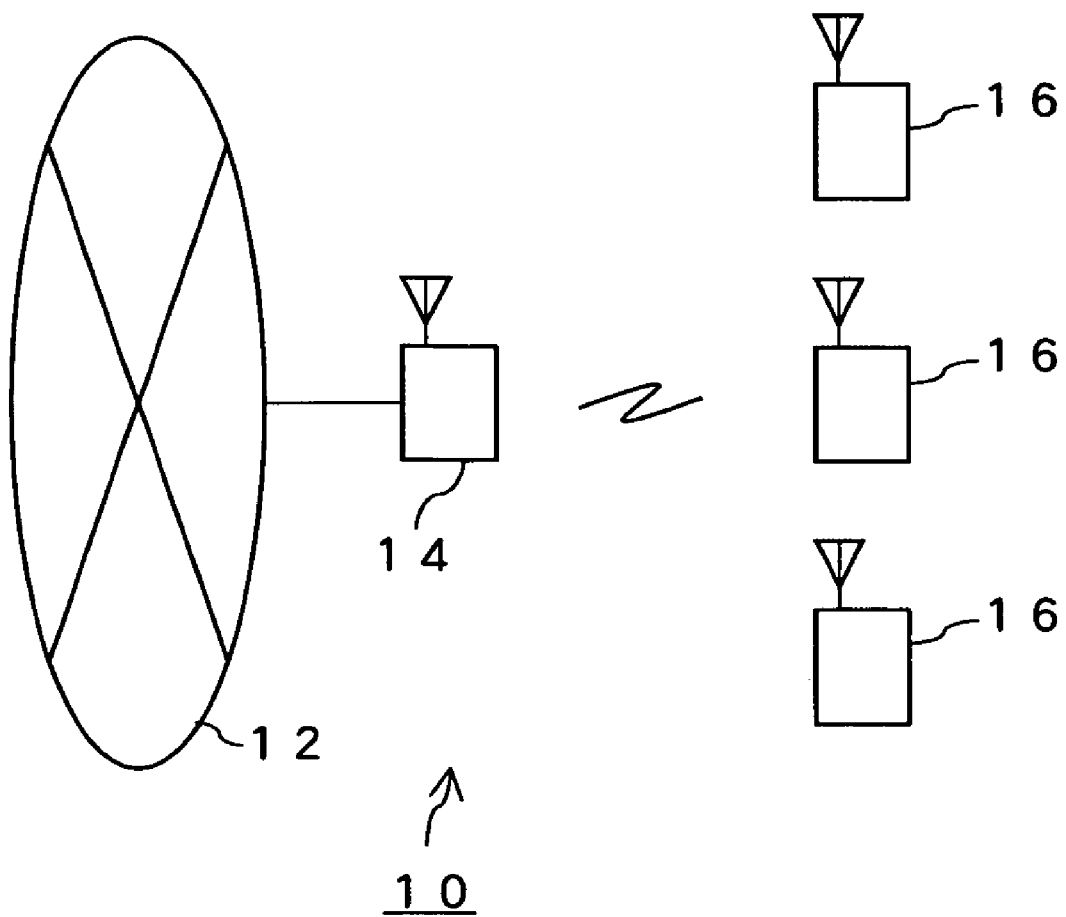
FIG. 1 is a view showing the entire construction of a mobile communication system in accordance with an embodiment of the invention.

FIG. 1 is a view showing the entire construction of a mobile communication system in accordance with the embodiment of the present invention. As shown in this figure, this mobile communication system 10 is comprised of a base station device 14 and plural mobile station devices (wireless communication devices) 16. The base station device 14 is connected to a communication network 12. When the base station device 14 receives data transmitted from the mobile station device 16, the base station device 14 sends these data to the communication network 12. Further, the base station device 14 receives data addressed to the mobile station device 16 and received through the communication network 12, and transfers these data to the mobile station device 16. Thus, the data communication of the mobile station device 16 is relayed in the base station device 14.

Further, in this mobile communication system 10, wireless communication is performed using a CDMA (Code Division Multiple Access) system, and the interference amount of upstream channels is calculated in the base station device 14. Whether this interference amount exceeds a threshold value or not is notified to the mobile station device 16 using a predetermined control channel. In the mobile station device 16, transmission power is controlled in accordance with these notified contents. Specifically, the interference amount is SINR (signal-to-interference noise ratio). In addition, the interference amount maybe also a carrier-to-noise ratio (C/N ratio). Further, the signal-to-interference noise ratio or the carrier-to-noise ratio may be calculated every mobile station, and a static amount such as a total sum or an average of these ratio may be also used as the interference amount of the entire base station.

Further, a pilot signal is notified from the base station device 14. In the mobile station device 16, synchronization with the base station 14 is obtained using this pilot signal. Further, its received power (received signal level) is observed so that the transmission power of an access packet is determined (open loop control). Namely, when the mobile communication system 10 obtains a received power level RX of the pilot signal, the mobile communication system 10 calculates basic power (basic signal transmission level) Pb[dB] in transmitting the access packet in accordance with the following formula (1). Here, "const" is a predetermined constant.

$$Pb = \text{const} - RX \tag{1}$$

Further, the mobile station calculates a correction amount A for correcting the basic power Pb thus obtained on the basis of interference amount information (information showing whether the upstream interference amount exceeds a predetermined threshold value or not) notified from the base station device 14. For example, as shown by the following formula (2), if it is notified by the interference amount information that the upstream interference amount exceeds the predetermined threshold value, the correction amount A is set to 20% of the basic power Pb, etc. Conversely, if it is notified by the interference amount information that the upstream interference amount is the predetermined threshold value or less, the correction amount A is set to 0. The correction amount A is desirably determined every time on the basis of the newest interference amount information (finally transmitted from the base station device 14) when transmitting data.

$$A = 0.2 \times Pb; \text{ where the interference amount exceeds the predetermined threshold value} \tag{2}$$

$$A = 0; \text{ where the interference amount is the predetermined threshold value or less} \tag{2}$$

As shown by the following formula (3), the signal transmission power level TX of a first time is calculated by adding this correction amount A to the basic power Pb calculated in accordance with the above formula (1). Namely, when the interference amount is large, the signal transmission power level TX is controlled so as to be increased (so as to become 1.2 times of the basic power Pb). Conversely, when the interference amount is small, the signal transmission power level TX is controlled so as to be the basic power Pb as it is.

$$TX = Pb + A \tag{3}$$

The mobile station device 16 first transmits the access packet (data for requesting a communication initiation from the mobile station device 16 to the base station device 14, namely connection request) to the base station device 14 in the transmission power TX thus obtained. In the base station device 14 receiving the access packet thus transmitted, a acknowledgement signal (ACK) is returned to the mobile station device 16 when the communication initiation is allowed in the mobile station device 16. The mobile station device 16 waits for the reception of the acknowledgement signal after the access packet is transmitted. When no acknowledgement signal can be received after a predetermined time has passed, the access packet is retransmitted to the base station device 14. In this case, n-th retransmission power dn[dB] is calculated in accordance with the following formulas (4) and (5).

$$dn = Pb + A + T\text{corr}(n) \tag{4}$$

$$T\text{corr}(n) = n \times B + \alpha \times \beta \times c \tag{5}$$

Here, Pb is the power obtained by the formula (1) and A is the correction amount obtained by the formula (2). B[dB] is a retransmitting step notified from the base station device 14 to the mobile station device 16. Further, n is a retransmitting number of times, and c is a correction base value. Here, this correction base value is set to a changing rate of the received power level of the pilot signal transmitted from the base station device 14. Moreover, α is e.g., a constant and β is a value according to the interference amount information of upstream channels notified from the base station device 14. Here, when this interference amount information shows that the present interference amount is larger than a predetermined threshold value, β is set to a value of 0.8. In contrast to this, when the interference amount information shows that the present interference amount is the predetermined threshold value or less, β is set to a value of 1. Namely, when the interference amount is large, the increase amount of the transmission power is controlled so as to be reduced. Conversely, when the interference amount is small, the increase amount of the transmission power is controlled so as to be increased. As described later, in the transmission power control of the access packet, the portion of the above basic power Pb is realized by control (gain control) of an amplification factor with respect to an amplifying section for increasing the amplitude of a carrier wave, and the above power increase amount A+Tcorr(n) is realized by power control of a primary CDMA carrier.

In this mobile communication system 10, since the transmission power of the access packet is determined as mentioned above, the access packet can be transmitted using power according to the actual communication situation at a-first transmitting time of the access packet. Thus, wasteful power consumption or an increase in connection time can be restrained. Further, the access packet can be also transmitted using the power according to the actual communication situation at the time of retransmitting the access packet. Therefore, the retransmitting power can be adaptively determined so that wasteful power consumption or the increase in connection time can be restrained. Further, when the interference amount is larger than the threshold value, an influence due to the correction base value is reduced. Accordingly, it is possible to restrain the interference amount in the base station device 14 from becoming excessively increased at the retransmitting time of the access packet.

In this mobile communication system 10, when no acknowledgement signal can be received from the base station device 14 although the access packet is transmitted a predetermined number of times, the mobile station device 16 waits for a predetermined time and the access packet is again retransmitted using the transmission power TX obtained by the formula (3). Thereafter, the access packet is sequentially transmitted using the retransmitting power dn obtained by the formula (4). In this case, the standby time may be fixed, or may be determined as a result of the base station device 14 generating a random number. If the standby time is determined by the random number, the standby time is changed every time so that traffic can be effectively dispersed.

When no acknowledgement signal can be received from the base station device 14 although the access packet is transmitted over the predetermined number of times, the access packet may be also transmitted using transmission power e[dB] obtained by the following formula (5) instead of the transmission of the access packet using the transmission power TX obtained by the formula (3).

$$e = TX + \alpha \times \beta \times c \tag{4}$$

Figure 2:
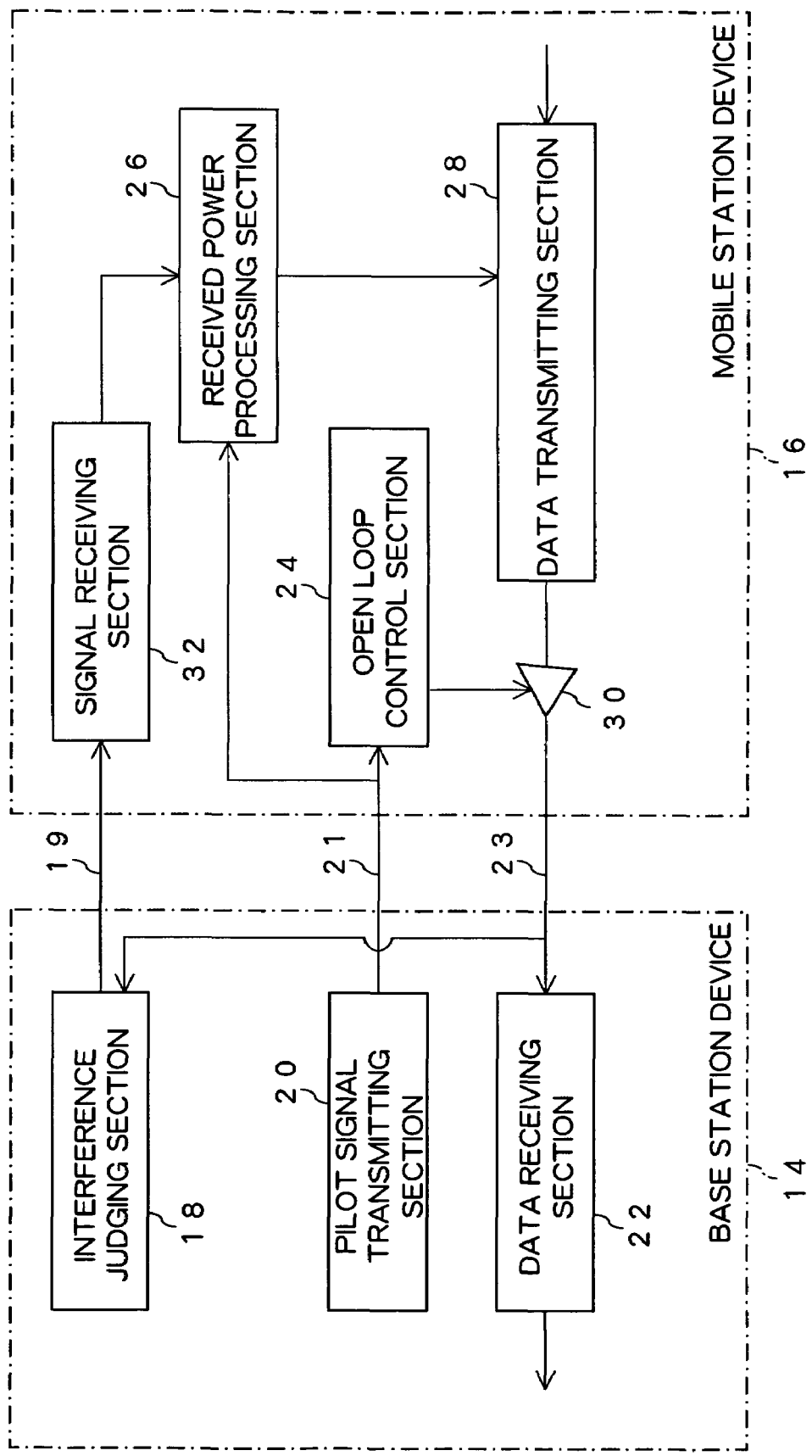
FIG. 2 is a function block diagram of the mobile communication system in accordance with the embodiment of the invention.

FIG. 2 is a view showing the construction of this mobile communication system 10. As shown in this figure, the base station device 14 in this mobile communication system 10 is comprised of an interference judging section 18, a pilot signal transmitting section 20 and a data receiving section 22. The mobile station device 16 is comprised of a signal receiving section 32, a received power processing section 26, an open loop control section 24, a data transmitting section 28 and an amplifying section 30.

The contents of the upstream data channel 23 are inputted to the interference judging section 18, and the interference amount of this upstream data channel 23 is measured, and it is judged whether this interference amount is greater than a predetermined threshold value or not. The judging result, i.e., interference amount information (RAB; Reverse Activity Bit) is transmitted (notified) to the mobile station device 16 via a control channel 19. A basic increase step (transmission power step B) in increasing the transmission power of the access packet is also transmitted via the control channel 19. On the other hand, the pilot signal transmitting section 20 transmits (notifies) the pilot signal via a pilot channel 21.

The contents of the upstream data channel 23, i.e., a data signal transmitted from the mobile station device 16 is inputted to the data receiving section 22, and the data receiving section 22 demodulates this data signal. The demodulated result is sent to the communication network 12 if necessary.

The signal receiving section 32 receives a control signal transmitted by the control channel 19, and reads the interference amount information and the transmission power step B included in this control signal. The interference amount information and the transmission power step B are inputted to the received power processing section 26. The pilot signal transmitted from the base station device 14 by the pilot channel 21 is inputted to the received power processing section 26, and the received power processing section 26 judges the received power level RX of this pilot signal. The rank of the received power level RX thus judged is stored to a signal receiving situation table held to an unillustrated memory for a predetermined time. The interference amount information inputted from the signal receiving section 32 is also stored in this signal receiving situation table. The received power processing section 26 calculates the power increase amount Tcorr(n) on the basis of the stored contents of the signal receiving situation table, and the interference amount information (corresponding to the coefficient β) and the retransmitting step B inputted from the signal receiving section 32. The calculated result is inputted to the data transmitting section 28. Further, the basic power Pb is calculated by applying the received level RX to the above formula (1), and the correction amount A is also calculated by applying the interference amount information and the basic power Pb to the above formula (2). Further, A+Tcorr(n) is calculated from the transmission power step B at the retransmitting time. Each of the calculated results is inputted to the data transmitting section 28.

The pilot signal transmitted from the base station device 14 using the pilot channel 21 is inputted to the open loop control section 24, and the gain of the amplifying section 30 is controlled in accordance with the received power level of the pilot signal. Specifically, the gain of the amplifying section 30 is controlled in accordance with the above formula (1).

The amplifying section 30 amplifies a spread spectrum signal outputted from the data transmitting section 28 in accordance with instructions from the open loop control section 24, and sends data to the upstream data channel 23 through an unillustrated antenna. An information code (here the access packet) is inputted from an unillustrated control section to the data transmitting section 28. The data transmitting section 28 generates a primary CDMA carrier (a PSK signal, an ASK signal, etc.) of a crest value according to the correction amount A or the power A+Tcorr(n) inputted from the received power processing section 26 in accordance with this information code. The data transmitting section 28 then performs spreading with respect to this primary CDMA carrier. The spread spectrum signal is inputted to the amplifying section 30.

Figures 3, 4:
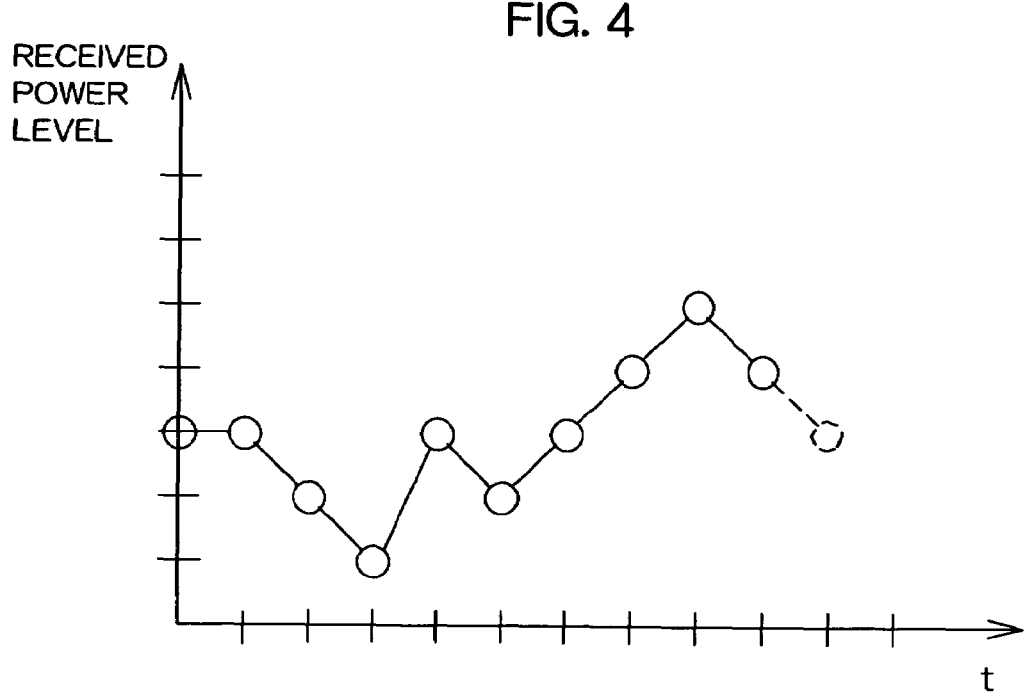
FIG. 3 is a view showing one example of a communication situation table stored to a received power processing section.
FIG. 4 is a view showing a calculating method of a correction base value.

FIG. 3 is a view showing one example of the signal receiving situation table stored to the received power processing section 26. As shown in this figure, a numerical value showing the signal receiving time of the pilot signal, the received power level of the pilot signal, and the interference amount information in this case are correspondingly stored to the signal receiving situation table. Here, the received power level of the pilot signal is divided into five ranks, and data (L1 to L5) for specifying these ranks are stored.

FIG. 4 is a view showing a calculating method of the correction base value c. The vertical axis of this FIG. 4 shows the received power level of the pilot signal, and the horizontal axis shows the receiving time of the pilot signal. The received power processing section 26 calculates the changing rate of the received power level of the pilot signal, and obtains this changing rate as the correction base value c. This changing rate may be the difference between a newest measured received power level and a received power level measured just before this newest measurement, and may be also an average of the changing rate of the received power level in each timing in which the received power level of the pilot signal is recorded to the signal receiving situation table. In addition, the correction base value c can be calculated by various methods on the basis of the stored contents of the signal receiving situation table.

Figure 5:
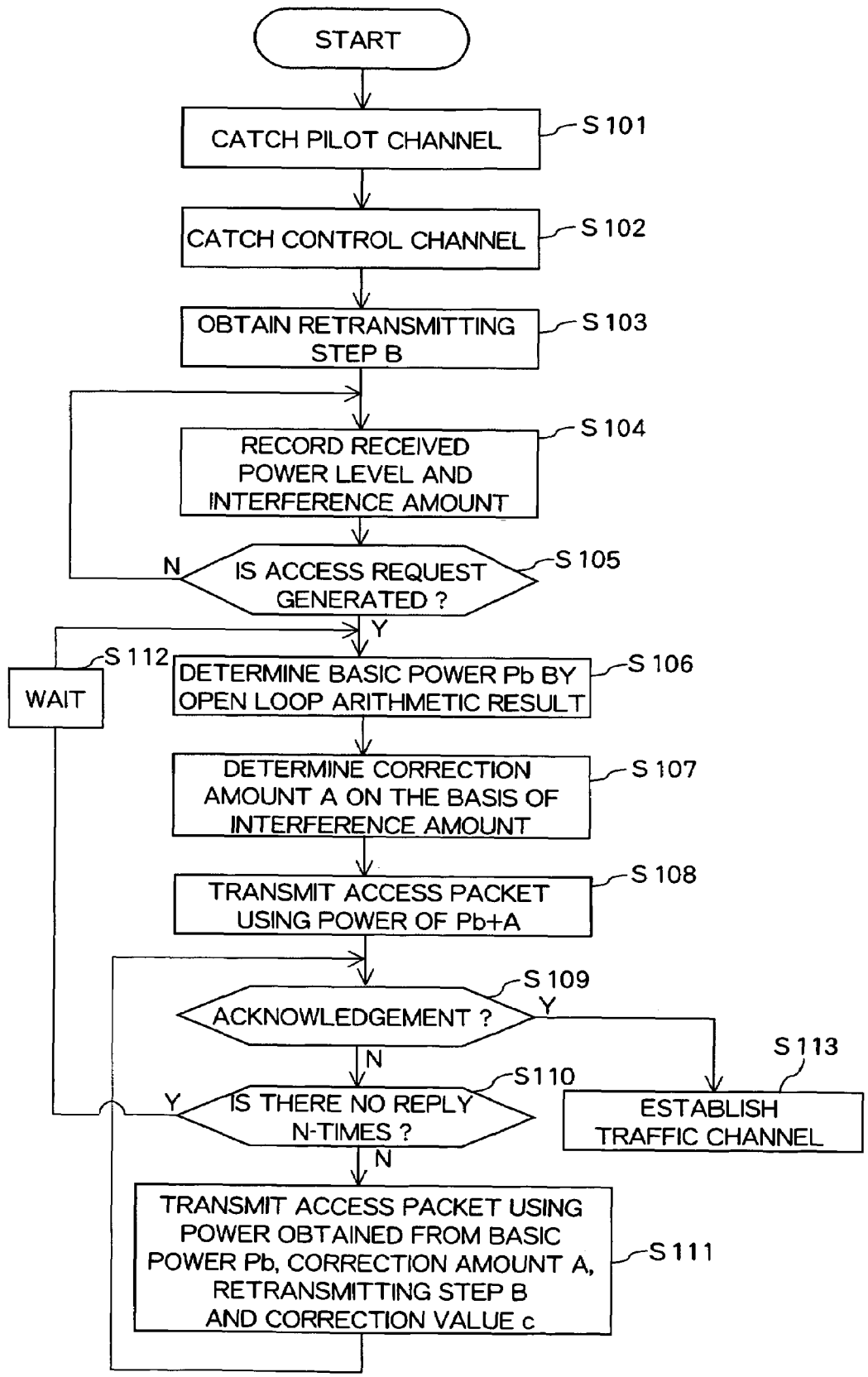
FIG. 5 is a flowchart showing the operation of a mobile station device in accordance with the embodiment of the invention.

FIG. 5 is a flow chart showing the transmitting operation of the access packet of the mobile station device 16. As shown in this figure, the open loop control section 24 first acquires the pilot channel 21 in the mobile station device 16 (S101). Further, the signal receiving section 32 acquires the control channel 19 (S102). The retransmitting step B is obtained from the control signal transmitted by the control channel 19 (step S103). Thereafter, the received power level of the pilot signal is measured in the received power processing section 26, and the received power processing section 26 sequentially stores this received power level to the signal receiving situation table, and also sequentially stores the interference amount information obtained in the signal receiving section 32 to this table (S104). The processing of S104 is repeated until an access request is generated (S105). In this case, when the received power level and the interference amount information larger than record numbers of the signal receiving situation table are obtained, oldest records are abandoned and the newest received power level and interference amount information are recorded instead of the oldest records.

Thereafter, when an access request is generated, the open loop control section 24 and the received power processing section 26 calculate the basic power Pb by the formula (1) (S106). The received power processing section 26 also obtains the interference amount information from the control signal transmitted by the control channel 19, and calculates the correction amount A in accordance with the contents of the interference amount information (S107). The access packet is then transmitted using power obtained by adding the correction amount A to the basic power Pb (S108). In this case, the crest value of the primary CDMA carrier is maintained to a default (already fixed value) in the data transmitting section 28. In response to the access packet thus transmitted, it is judged whether an acknowledgement signal is returned from the base station device 14 or not (S109). If the acknowledgement signal is returned, a traffic channel is established (S113) and it proceeds to data communication processing. In contrast to this, if no acknowledgement signal is returned, it is judged whether there is no reply n-times (no acknowledgement signal is transmitted) or not (S110). If there is no reply n-times, it waits for a predetermined time, or a time determined by a random number (S112), and the processing of S106 is again executed. In contrast to this, if it is not judged that there is no reply n-times, the open loop control section 24 calculates the basic power Pb in accordance with the above formula (1) and controls the operation of the amplifying section 30 by using the value of the basic power Pb. Further, the received power processing section 26 calculates the changing amount of the received power from the contents of the signal receiving situation table, obtains this changing amount as the correction base value c and determines the coefficient β on the basis of the interference amount information recorded to the signal receiving situation table. The received power processing section 26 then calculates the power increase amount Tcorr(n) by substituting these values and the retransmitting step B already received by the signal receiving section 32 in S103 into the above formula (5). The received power processing section 26 further controls the crest value of the primary modulated wave of the access packet by using the sum of the value of the power increase amount Tcorr(n) and the correction amount A (S111). The received power processing section 26 is set so as to manage the retransmitting number of times n. Thus, the access packet is retransmitted using the transmission power shown by the above formula (4).

In accordance with the mobile communication system 10 described above, when the access packet is transmitted from the mobile station device 16 to the base station device 14, its transmission power can be suitably determined. Namely, in the mobile communication system 10, when the access packet is first sent from the mobile station device 16 to the base station device 14 and the upstream interference amount is large, the transmission power of the access packet is raised in accordance with this upstream interference amount. Further, the received power level of the pilot signal is sequentially stored to the signal receiving situation table, and Tcorr(n) is calculated on the basis of its stored contents and is used in the determination of the retransmitting power of the access packet. Therefore, even when there is an influence of sudden fading, etc., the access packet can be reliably received by the base station device 14. Thus, it is possible to suitably prevent the connection time from being lengthened, and reduce consumed power for the access packet transmission. Further, the control of the transmission power of the access packet according to Tcorr(n) is realized by the control of the crest value of the primary modulated wave. Accordingly, even when the received power level stored to the signal receiving situation table is suddenly changed, the power of the access packet can be appropriately determined with a high degree of responsiveness.

While there have been described what are at present considered to be preferred embodiments of the invention, it will be understood that various modifications may be made thereto, and it is intended that the appended claims cover all such modifications as fall within the true spirit and scope of the invention.

What is claimed is:

1. A wireless communication device comprising:
  first transmitting means for transmitting a connection request to a base station; and
  retransmitting means for retransmitting the connection request when no acknowledgement is received from the base station in response to the transmission of the connection request;
  the wireless communication device further comprising:
  received power memory means for sequentially storing received power of a predetermined signal transmitted from the base station; and
  retransmitting power determining means for determining the transmission power of the connection request using the retransmitting means on the basis of the stored contents of the received power memory means, wherein
  the retransmitting power determining means determines a power increase amount on the basis of the stored contents of the received power memory means, and also determines the transmission power of the connection request using the retransmitting means by adding the power increase amount to the transmission power of the first transmitting means.

2. The wireless communication device according to claim 1, wherein
  the retransmitting power determining means calculates a changing rate of the received power stored in the received power memory means, and determines the power increase amount on the basis of this changing rate.

3. The wireless communication device according to claim 1, wherein
  the base station and the wireless communication device perform wireless communication using a code division multiple access system, and further includes means for receiving interference amount information in the base station from the base station, and
  the retransmitting power determining means further determines the transmission power of the connection request using the retransmitting means on the basis of the interference amount information.

4. The wireless communication device according to claim 1, wherein
  transmission of the connection request using the first transmitting means is again executed if no acknowledgement is received from the base station when the connection request are transmitted by a predetermined number of times.

5. The wireless communication device according to claim 4, wherein
  transmission of the connection request using the first transmitting means is again executed after the passage of a predetermined standby time if no acknowledgement is received from the base station when the connection request is transmitted a predetermined number of times.

6. The wireless communication device according to claim 1, wherein
  the transmission of the connection request using the first transmitting means is again executed by the transmission power determined on the basis of the stored contents of the received power memory means if no acknowledgement is received from the base station when the connection request are transmitted by a predetermined number of times.

7. A wireless communication device comprising:
  first transmitting means for transmitting a connection request to a base station; and
  retransmitting means for retransmitting the connection request when no acknowledgement is received from the base station in response to the transmission of the connection request;

the wireless communication device further comprising:

received power memory means for sequentially storing received power of a predetermined signal transmitted from the base station; and retransmitting power determining means for determining the transmission power of the connection request using the retransmitting means on the basis of the stored contents of the received power memory means, wherein transmission of the connection request using the first transmitting means is again executed if no acknowledgement is received from the base station when the connection request are transmitted by a predetermined number of times, wherein transmission of the connection request using the first transmitting means is again executed after the passage of a standby time determined on the basis of a random number if no acknowledgement is received from the base station when a connection request is transmitted by the predetermined number of times.

8. A connection request transmission power control comprising:

a first transmitting step for transmitting the connection request to a base station;

a retransmitting step for retransmitting the connection request when no acknowledgement is received from the base station in response to the transmission of the connection request;

a step for sequentially storing received power of a predetermined signal transmitted from the base station to received power memory means; and a retransmitting power determining step for determining the transmission power of the connection request in the retransmitting step on the basis of the stored contents of the received power memory means, wherein the retransmitting power determining step determines a power increase amount on the basis of the stored contents of the step for sequentially storing received power, and also determines the transmission power of the connection request using the retransmitting step by adding the power increase amount to the transmission power of the first transmitting step.

9. A wireless communication device comprising:

interference amount information obtaining means for obtaining interference amount information showing an interference amount in a base station; and data transmitting means for transmitting connection request to the base station using power according to the interference amount information, wherein the data transmitting means comprises:

basic power determining means for determining basic power in transmitting the connection request to the base station; and power correcting means for correcting the basic power in accordance with the interference amount; wherein the connection request is transmitted using the power provided by correcting the basic power in accordance with the interference amount.

10. The wireless communication device according to claim 9, the basic power determining means including received power obtaining means for obtaining the received power of a predetermined signal transmitted from the base station, wherein the basic power is determined on the basis of the received power of the predetermined signal.

11. The wireless communication device according to claim 9, the wireless communication device further comprising data retransmitting means for retransmitting the connection request to the base station using transmission power provided by adding a predetermined value to the transmission power determined by the transmission power determining means when no acknowledgement is received from the base station in response to the transmission of the connection request using the data transmitting means.

12. A connection request transmission power control method for a wireless communication device comprising:

an interference amount information obtaining step for obtaining interference amount information showing an interference amount in a base station; and a data transmitting step for transmitting the connection request to the base station using power according to the interference amount information, wherein the data transmitting step comprises:

a basic power determining step for determining basic power in transmitting the connection request to the base station; and a power correcting step for correcting the basic power in accordance with the interference amount; wherein the connection request is transmitted using the power provided by correcting the basic power in accordance with the interference amount.

* * * * *